US009754154B2

United States Patent
Craig et al.

(10) Patent No.: US 9,754,154 B2
(45) Date of Patent: Sep. 5, 2017

(54) IDENTIFICATION USING DEPTH-BASED HEAD-DETECTION DATA

(71) Applicant: Microsoft Technology Licensing, LLC, Redmond, WA (US)

(72) Inventors: Robert M. Craig, Bellevue, WA (US); Vladimir Tankovich, Bellevue, WA (US); Craig Peeper, Kirkland, WA (US); Ketan Dalal, Seattle, WA (US); Bhaven Dedhia, Bellevue, WA (US); Casey Meekhof, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 217 days.

(21) Appl. No.: 14/559,757

(22) Filed: Dec. 3, 2014

(65) Prior Publication Data

US 2015/0086108 A1 Mar. 26, 2015

Related U.S. Application Data

(63) Continuation-in-part of application No. 13/768,144, filed on Feb. 15, 2013, now Pat. No. 8,924,735.

(51) Int. Cl.
*G06K 9/00* (2006.01)
*G06T 17/20* (2006.01)
*G06F 21/32* (2013.01)

(52) U.S. Cl.
CPC ......... *G06K 9/00241* (2013.01); *G06F 21/32* (2013.01); *G06T 17/20* (2013.01); *G06T 2207/10021* (2013.01); *G06T 2207/20021* (2013.01); *G06T 2207/30201* (2013.01); *G06T 2210/12* (2013.01)

(58) Field of Classification Search
CPC .......... G06F 3/011; G06F 3/012; G06F 3/017; G06T 2207/10028; G06T 2207/10048
See application file for complete search history.

(56) References Cited

U.S. PATENT DOCUMENTS

| 5,930,804 A | 7/1999 | Yu et al. |
|---|---|---|
| 6,184,926 B1 * | 2/2001 | Khosravi ........... G06K 9/00234 348/14.07 |
| 6,920,236 B2 | 7/2005 | Prokoski |

(Continued)

FOREIGN PATENT DOCUMENTS

TW 201419172 A 5/2014

OTHER PUBLICATIONS

Nakajima, C. et al., "People Recognition in Image Sequences by Supervised Learning," MIT Artificial Intelligence Laboratory and Center for Biological and Computational Learning Department of Brain and Cognitive Sciences, A.I. Memo No. 1688, C.B.C.L. Paper No. 188, Jun. 2000, 13 pages.

(Continued)

*Primary Examiner* — Wesley Tucker
(74) *Attorney, Agent, or Firm* — Alleman Hall Creasman & Tuttle LLP

(57) ABSTRACT

A candidate human head is found in depth video using a head detector. A head region of light intensity video is spatially resolved with a three-dimensional location of the candidate human head in the depth video. Facial recognition is performed on the head region of the light intensity video using a face recognizer.

20 Claims, 7 Drawing Sheets

(56) References Cited

U.S. PATENT DOCUMENTS

| | | | |
|---|---|---|---|
| 6,944,319 B1 | 9/2005 | Huang et al. | |
| 7,469,060 B2 | 12/2008 | Bazakos et al. | |
| 7,823,681 B2 | 11/2010 | Crespo et al. | |
| 7,864,987 B2 | 1/2011 | Venkatanna et al. | |
| 8,073,287 B1 | 12/2011 | Wechsler et al. | |
| 8,150,155 B2 | 4/2012 | El-Maleh et al. | |
| 8,243,929 B2 | 8/2012 | Wells et al. | |
| 8,265,341 B2 | 9/2012 | Dernis et al. | |
| 8,294,767 B2 | 10/2012 | Mathe et al. | |
| 8,334,842 B2 | 12/2012 | Markovic et al. | |
| 8,494,227 B2 | 7/2013 | Prokoski | |
| 8,687,880 B2 | 4/2014 | Wei et al. | |
| 8,798,327 B2* | 8/2014 | Hu | G06K 9/00248 382/107 |
| 2003/0052971 A1* | 3/2003 | Gutta | H04N 5/232 348/159 |
| 2005/0055582 A1 | 3/2005 | Bazakos et al. | |
| 2009/0244309 A1* | 10/2009 | Maison | G06K 9/00369 348/222.1 |
| 2011/0007142 A1* | 1/2011 | Perez | G06F 3/017 348/77 |
| 2011/0025689 A1* | 2/2011 | Perez | A63F 13/63 345/420 |
| 2011/0052006 A1* | 3/2011 | Gurman | G06K 9/00201 382/103 |
| 2011/0221670 A1 | 9/2011 | King, III et al. | |
| 2012/0169887 A1 | 7/2012 | Zhu et al. | |
| 2012/0239196 A1* | 9/2012 | Olivier, III | B25J 9/1689 700/259 |
| 2012/0242800 A1* | 9/2012 | Ionescu | G06F 3/017 348/46 |
| 2012/0257797 A1* | 10/2012 | Leyvand | G06K 9/00221 382/118 |
| 2013/0113956 A1 | 5/2013 | Anderson et al. | |
| 2014/0139629 A1 | 5/2014 | Baiyya et al. | |
| 2014/0237587 A1 | 8/2014 | Forbes et al. | |
| 2014/0307927 A1* | 10/2014 | Folmer | A61B 5/7267 382/107 |
| 2014/0362188 A1* | 12/2014 | Yokokawa | A63F 13/42 348/47 |
| 2015/0123967 A1* | 5/2015 | Quinn | G06T 13/40 345/420 |

OTHER PUBLICATIONS

Hizem, W. et al., "Near Infrared Sensing and Associated Landmark Detection for Face Recognition," J. Electron. Imaging., vol. 17, No. 1, Mar. 2008, 12 pages.

Gernoth, T. et al., "Camera Characterization for Face Recognition under Active Near-Infrared Illumination," SPIE 7529, Image Quality and System Performance VII, Jan. 2010, 10 pages.

Sklebar, F. et al., "Machine Learning Algorithms for Face Recognition," Summer School of Science Workshop, Croatia, Jan. 2011, 13 pages.

Leyvand, T. et al., "Kinect Identity: Technology and Experience," IEEE Biometrics Compendium: Computer, vol. 44, No. 4, Apr. 2011, 4 pages.

Bhowmik, M. et al., "Thermal Infrared Face Recognition—a Biometric Identification Technique for Robust Security System," Reviews, Refinements and New Ideas in Face Recognition, Chapter 6, Jul. 2011, 27 pages.

"Access Control and Personalization for Consumer Electronics," Bionym.com, http://www.bionym.com/tech/heartid/#n, Available as Early as Oct. 9, 2012, 2 pages.

Wei, Y., "Vision and Graphics Applications on Kinect," Microsoft Research Asia Faculty Summit 2012, Nov. 2012, 29 pages.

ISA European Patent Office, International Search Report and Written Opinion Issued in Application No. PCT/US2014/016156, Apr. 25, 2014, WIPO, 10 pages.

ISA European Patent Office, Second Written Opinion Issued in Application No. PCT/US2014/016156, Sep. 26, 2014, WIPO, 6 pages.

Kar, Abhishek, "Skeletal Tracking using Microsoft Kinect", In Proceeding of Methodology, May 12, 2013, 6 Pages.

Birch, et al., "Human Tracking with Multiple Parallel Metrics", In Proceedings of International Conference on Imaging for Crime Detection and Prevention, Dec. 16, 2013, 6 pages.

Krotosky, et al., "Face Detection and Head Tracking using Stereo and Thermal Infrared Cameras for "Smart" Airbags: A Comparative Analysis", In Proceeding of the 7th International IEEE Conference on Intelligent Transportation Systems, Oct. 3, 2004, 6 pages.

Hossny, et al., "Low Cost Multimodal Facial Recognition via Kinect Sensors", In Proceedings of Land Warfare Conference, Oct. 29, 2012, 11 pages.

* cited by examiner

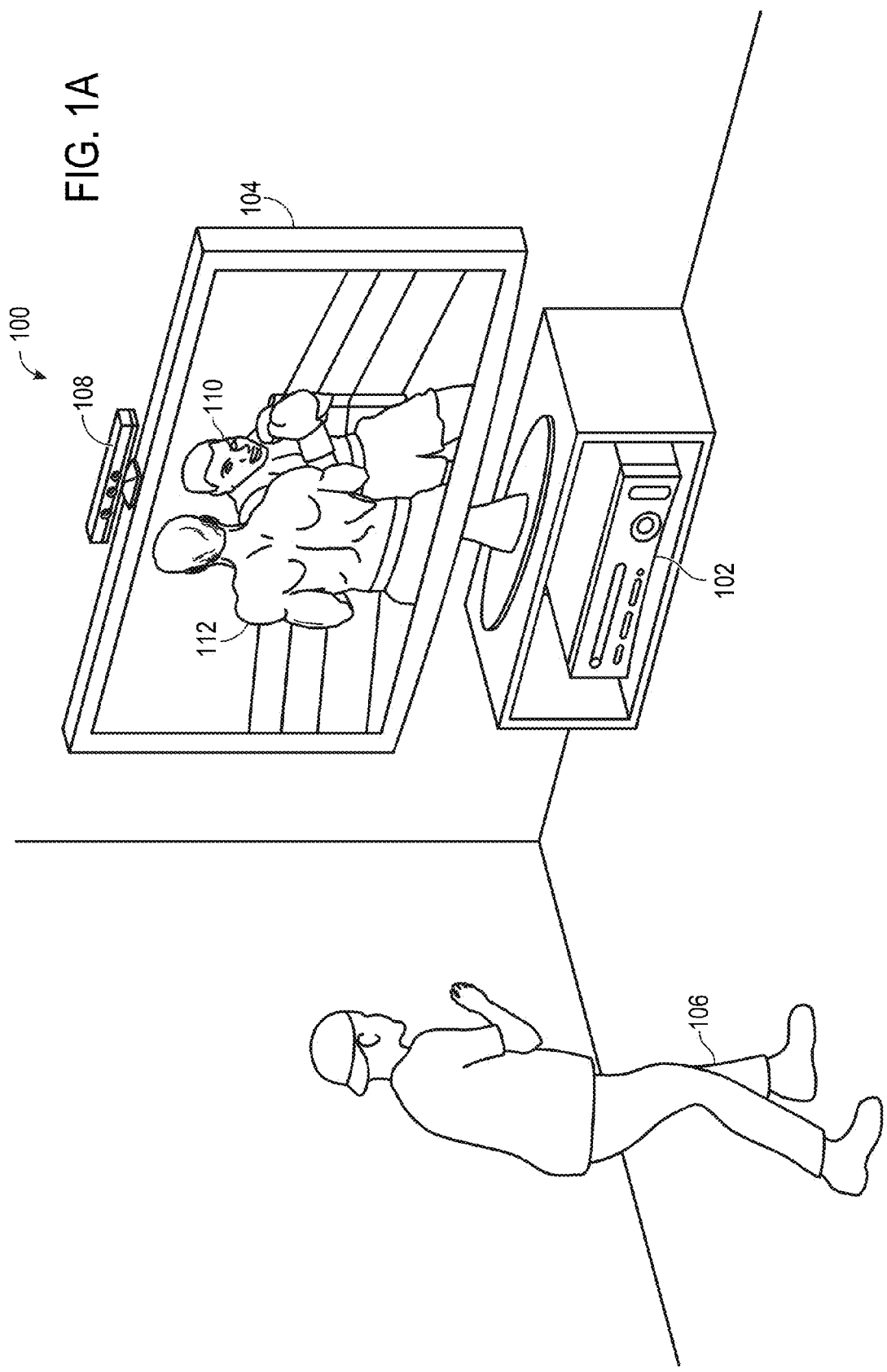

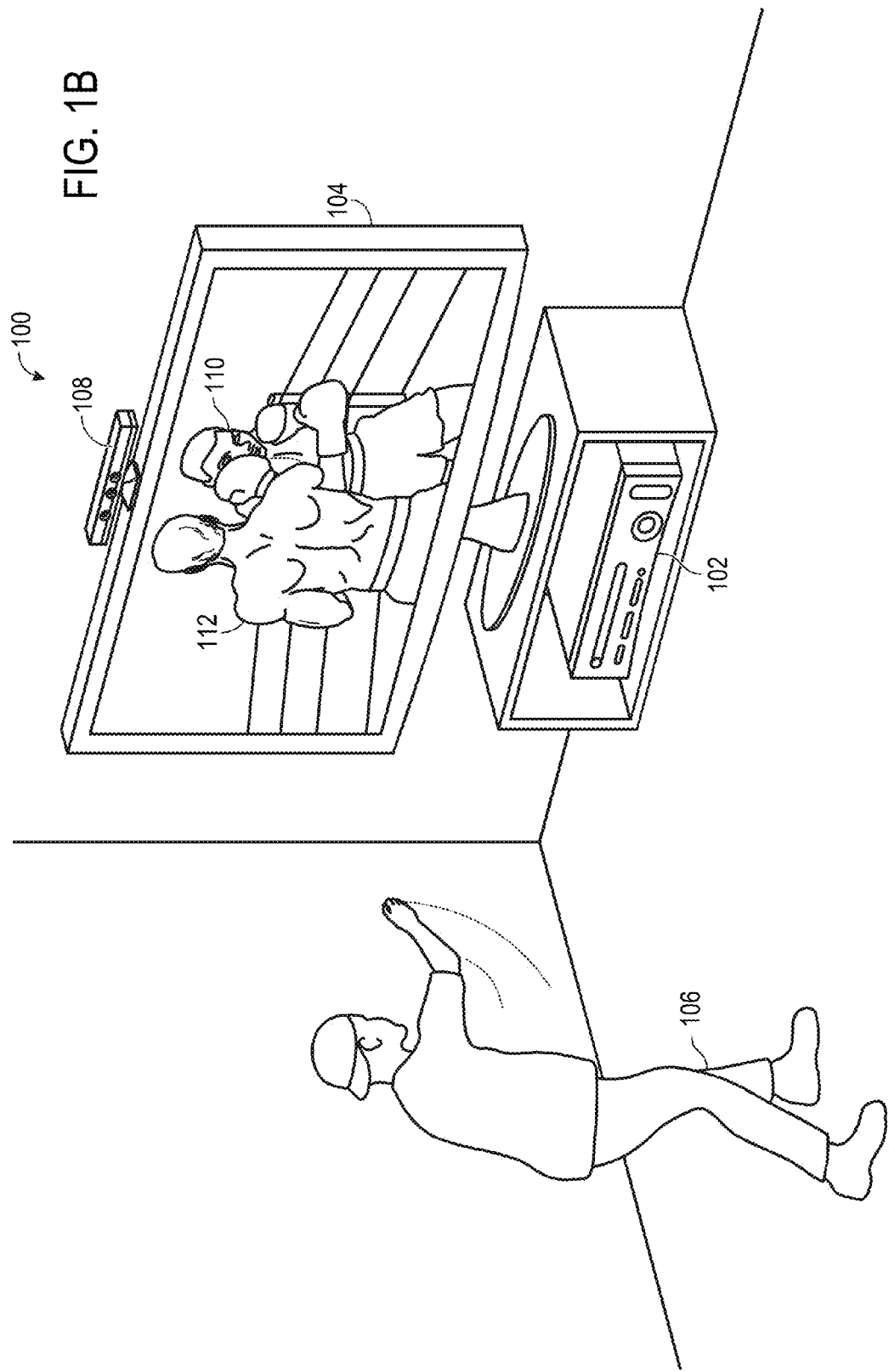

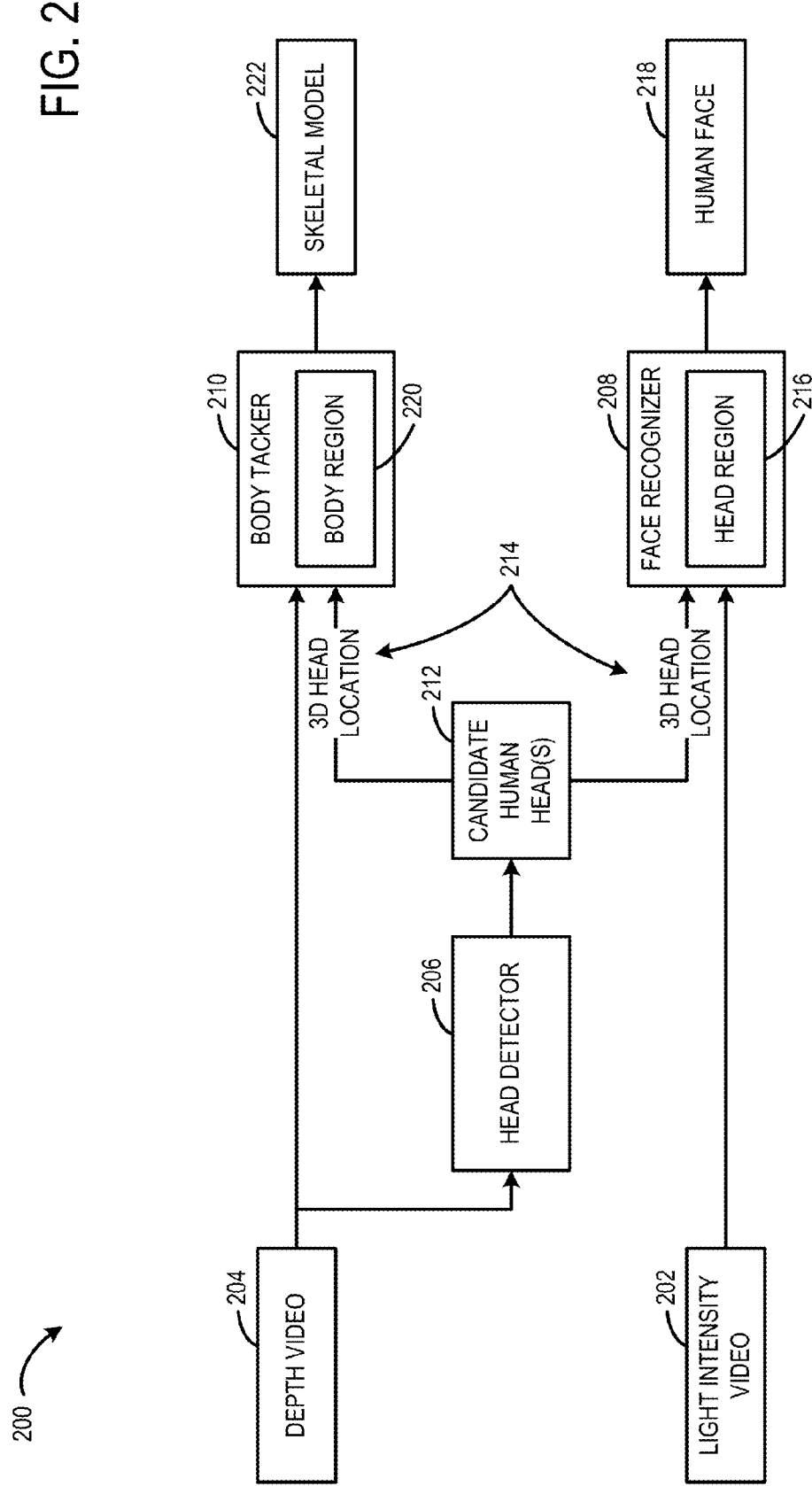

US 9,754,154 B2

IDENTIFICATION USING DEPTH-BASED HEAD-DETECTION DATA

CROSS REFERENCE TO RELATED APPLICATIONS

This application is a continuation-in-part of U.S. patent application Ser. No. 13/768,144, filed on Feb. 15, 2013, and titled "MANAGED BIOMETRIC IDENTITY", the entire disclosure of which is hereby incorporated herein by reference.

BACKGROUND

Some computing systems attempt to model human subjects using skeletal tracking. Skeletal tracking may serve as a basis for gesture-based interactions, speaker correlation, controller pairing, and other features. When skeletal tracking is unable to track a human subject, such features may not function at full fidelity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

In an embodiment, a candidate human head is found in depth video using a head detector. A head region of a light intensity video is spatially resolved with a three-dimensional location of the candidate human head in the depth video. Facial recognition is performed on the head region of the light intensity video using a face recognizer.

BRIEF DESCRIPTION OF THE DRAWINGS

FIGS. 1A and 1B show an example natural user input (NUI) computing system imaging a human subject.

FIG. 2 shows an example pipeline for identifying and tracking a user.

DETAILED DESCRIPTION

Figure 5:
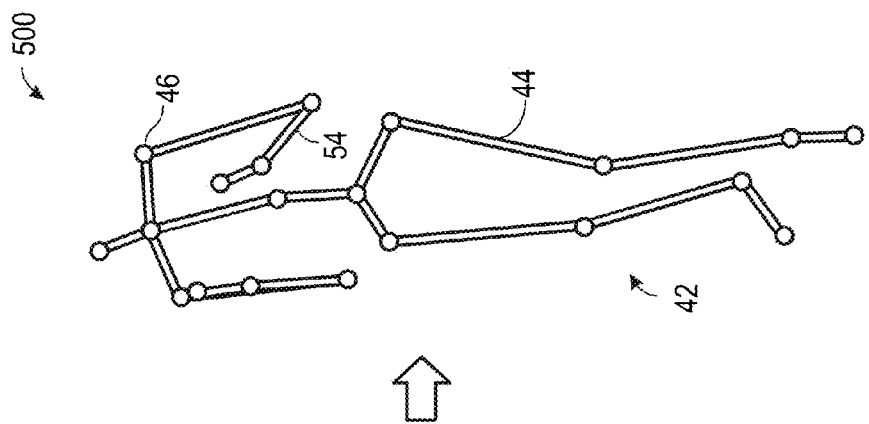
FIG. 5 shows a graphical representation of an example skeletal model produced by the pipeline of FIG. 2.

The present disclosure relates to a robust approach of cooperatively using different computer vision technologies to quickly identify and track human subjects. More particularly, the approach may include performing facial recognition on an image frame or video (e.g., a light intensity image frame or video, such as an infrared, grayscale, or color image frame or video) to biometrically identify one or more human subjects in a scene. The intensity-based facial recognition may use depth-based, head-detection data as a seed for limiting a search area of a light intensity image frame or video for finding human faces. The process of intensity-based facial recognition may be resource intensive relative to depth-based head detection. Thus, by performing depth-based head detection to limit a spatial region of a light intensity image frame or video on which facial recognition is performed, an amount of facial recognition processing may be reduced and overall processing resource utilization may be decreased. Such a decrease in processing resource utilization may allow for facial recognition to be optionally performed at a higher frame rate and/or with more demanding detection mechanisms, which may increase facial recognition accuracy. Moreover, reduced facial recognition processing may result in faster biometric identification of a human subject, decreased energy usage, and/or the ability to perform on lower power computers.

Furthermore, by relying on facial recognition seeded with depth-based, head-detection data, biometric identification of a human subject may be performed even in scenarios where an entire body of a human subject cannot be tracked via skeletal/body tracking. For example, in a scenario where biometric identification requires skeletal/body tracking, if a human subject is seated and deeply reclined, covered by a blanket, or otherwise occluded by a piece of furniture, then skeletal/body tracking may be unable to lock-on to the human subject for biometric identification. However, in such cases, the head of the human subject may be detectable by a depth-based head detector. Accordingly, intensity-based facial recognition and depth-based head-detection may still be performed to provide biometric identification and tracking.

As described in more detail below, a natural user input tracking device including a depth camera, a color/grayscale/infrared camera, and/or other imaging source may be used to two- and/or three-dimensionally image one or more observed human subjects. Depth information and light intensity (e.g., color/grayscale/infrared) information acquired by the tracking device may be used to efficiently and accurately model and track the one or more observed human subjects. In particular, the one or more observed human subjects may be modeled as a virtual skeleton or other machine-readable body model. The virtual skeleton or other machine-readable body model may be used as an input to control virtually any aspect of a computer. In this way, the computer provides a natural user interface that allows users to control the computer with spatial gestures.

FIGS. 1A and 1B show a nonlimiting example of a natural user input (NUI) system 100. The NUI system 100 includes a computing system 102 depicted in the illustrated example as an entertainment computing system configured to play a variety of different games, other media content, and/or control or manipulate non-game applications. A display 104 may be in communication with the computing system 102. The display 104 may be configured to present video to human subjects, such as a game player 106. A tracking device 108 may be configured to image or otherwise track (e.g., via audio) one or more human subjects, such as the game player 106. For example, the tracking device 108 may include a depth camera, a visible light (e.g., RGB color) camera, an infrared camera, a microphone, and/or other sensors configured to track observed human subjects. In some implementations, the infrared camera may be part of a depth sensor of the tracking device 108. In one example, the depth camera may be a structured-light depth camera. In another example, the depth camera may be a time-of-flight depth camera.

FIGS. 1A and 1B shows a scenario in which the tracking device 108 tracks the game player 106 so that movements of the game player 106 may be interpreted by the computing system 102. In the illustrated example, the movements of the game player 106 are interpreted as controls that can be used to affect a video game being executed by the computing system 102. In other words, the game player 106 may use his movements to control the video game. The movements of the game player 106 may be interpreted as virtually any type of game control.

The example scenario illustrated in FIG. 1A shows the game player 106 playing a boxing game that is being executed by the computing system 102. The display 104 visually presents a boxing opponent 110 to the game player 106. Furthermore, the display 104 visually presents a player avatar 112 that the game player 106 controls with his movements. As shown in FIG. 1B, the game player 106 can throw a punch in a physical space as an instruction for the player avatar 112 to throw a punch in a virtual space of the video game. The computing system 102 and/or the tracking device 108 can be used to recognize and analyze the punch of the game player 106 in physical space so that the punch can be interpreted as a game control that causes player avatar 112 to throw a punch in virtual space. For example, FIG. 1B shows the display 104 visually presenting the player avatar 112 throwing a punch that strikes boxing opponent 110 responsive to the game player 106 throwing a punch in physical space.

Virtually any controllable aspect of an operating system, application, or other computing product may be controlled by movements of a human subject. The illustrated boxing scenario is provided as an example, but is not meant to be limiting in any way. To the contrary, the illustrated scenario is intended to demonstrate a general concept, which may be applied to a variety of different applications without departing from the scope of this disclosure.

The example NUI system 100 is nonlimiting. A variety of different computing systems may utilize NUI information for a variety of different purposes without departing from the scope of this disclosure. For example, a NUI system may be configured to biometrically identify, recognize, analyze, and/or track one or more human subjects, such as the game player 106 (also referred to as a human subject).

As discussed above, it may be desirable to quickly lock-on and identify human subjects in a scene observed by a tracking device. Accordingly, the computing system 102 may execute a pipeline configured to perform such operations. FIG. 2 shows an example pipeline 200. The pipeline 200 may utilize a plurality of modules to perform different identifying and tracking operations. In the illustrated example, the pipeline 200 includes a previously-trained, machine-learning head detector 206, previously-trained, machine-learning face recognizer 208, and a previously-trained, machine-learning body tracker 210. It is to be understood that the modules of pipeline 200 alternatively may be trained without machine-learning and/or otherwise configured to detect heads, faces, and/or bodies.

Each of the plurality of machine-learning modules may be previously trained on different ground truths to classify input data. For example, in the case of the body tracker 210, the ground truths may include a prior-trained collection of known poses. In other words, during a supervised training phase, a variety of different people are observed in a variety of different poses, and human trainers provide ground truth annotations labeling different machine-learning classifiers in the observed data. The observed data and annotations are used to generate one or more machine-learning algorithms that map inputs (e.g., observation data from a tracking device) to desired outputs (e.g., body part indices for relevant pixels).

The pipeline 200 may receive light intensity video 202 from a camera. In one example, the light intensity video 202 may include a plurality of image frames of an observed scene. Each image frame may include a plurality of pixels. Each pixel may indicate an intensity of light reflected to that pixel from a surface in the scene. Note that references to light intensity video may include a single image frame of the light intensity video. For example, discussion of facial recognition performed on light intensity video may, in some cases, refer to facial recognition performed on a single image frame of the light intensity video.

The light intensity video may be representative of a relative intensity of any type of visible or non-visible light. For example, the light intensity video may be a red, green, blue (RBG) color video, a grayscale video, an infrared video, or another suitable visual representation of light intensity. For the sake of simplicity, non-limiting examples provided herein are discussed in the context of infrared video. Regardless of the wavelength(s) of light characterized by the light intensity video, the video may include a series of time-consecutive frames, each frame may include a matrix of pixels, and each pixel may record a light intensity value of the relevant wavelength(s) of light.

FIGS. 3-8 show example graphical representations of data at different stages throughout the pipeline 200. The example graphical representations correspond to the game player 106 as imaged by the tracking device 108 of the NUI system 100 of FIG. 1. Underlying data corresponding to the scene imaged by the tracking device may include other portions (e.g., background or other users), but only the user is depicted for ease of understanding.

Figure 3:
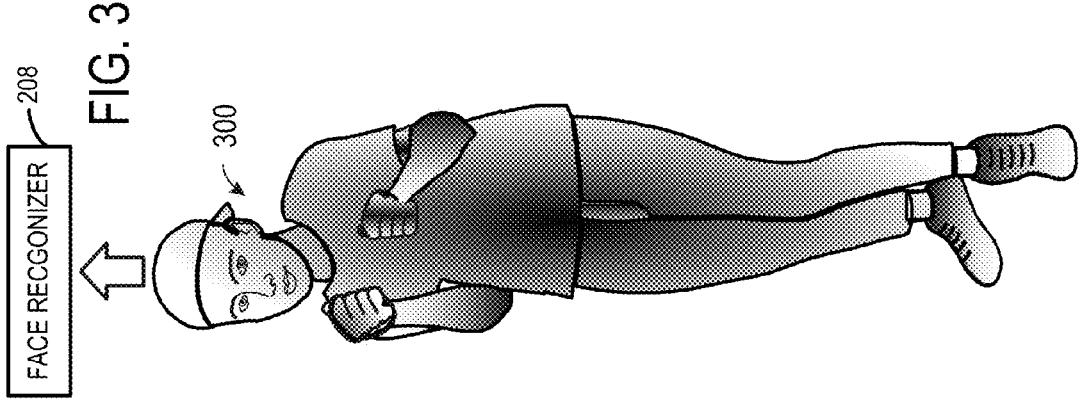
FIG. 3 shows a graphical representation of an example infrared video used to perform facial recognition by the pipeline of FIG. 2.

FIG. 3 shows an example infrared image 300 of the game player 106 from a perspective of an infrared camera of the tracking device 108. The infrared image 300 may be a user-only portion of a representative image frame of light intensity video 202 of FIG. 2, for example. The infrared image 300 may be a false-color representation of relative infrared reflection levels of the game player 106. While FIG. 3 depicts a single image frame, it is to be understood that a human subject may be continuously observed and modeled (e.g., at 30 frames per second). Accordingly, data may be collected for each such observed image frame. The collected data may be made available via one or more Application Programming Interfaces (APIs) and/or further analyzed as described below.

Turning back to FIG. 2, the pipeline 200 may receive depth video 204 as input. In one example, the depth video 204 includes a plurality of depth image frames or depth maps of an observed scene. Each depth map may include a plurality of depth pixels. Each depth pixel may indicate a depth of a surface in the scene that is imaged by that pixel. For example, the depth may be represented as a three-dimensional location (e.g., x/y/z coordinates or pixel address+z coordinate). Similar coordinates may be recorded for every pixel of the depth camera. The coordinates for all of the pixels collectively constitute a depth map. The coordinates may be determined in any suitable manner without departing from the scope of this disclosure. For example, time of flight, structured light, or stereo imaging may be used to assess the depth value for each of a plurality of depth pixels.

Figure 4:
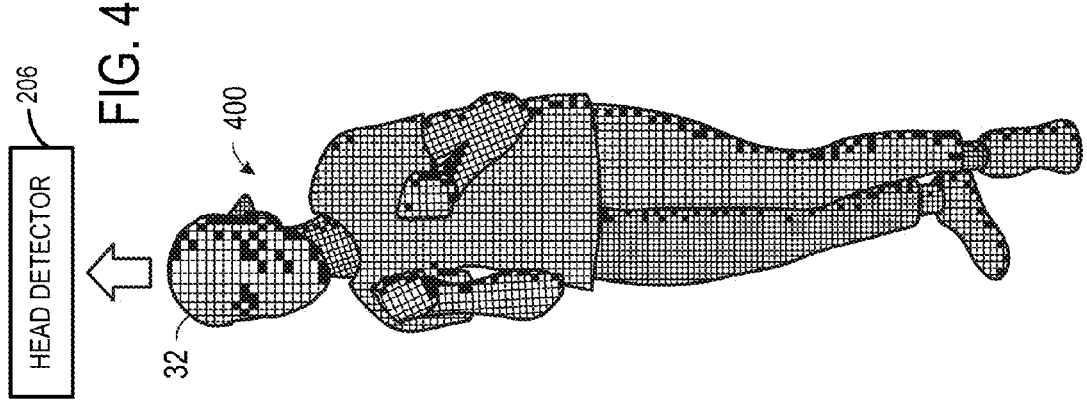
FIG. 4 shows a graphical representation of an example depth map used to perform head detection and skeletal modeling pipeline of FIG. 2.

FIG. 4 shows an example depth map 400 of the game player 106 from a perspective of a depth camera of the tracking device 108. The depth map 400 may be a user-only portion of a representative depth image frame of depth video 204 of FIG. 2, for example. The depth map 400 may be a representative depth map of depth video 204. The depth map 400 may be a graphical representation of depths of the various surfaces of the game player 106 relative to the depth camera of the tracking device 108. While FIG. 4 depicts a single depth map, it is to be understood that a human subject may be continuously observed and modeled (e.g., at 30 frames per second). Accordingly, data may be collected for each such depth map. The collected data may be made available via one or more Application Programming Interfaces (APIs) and/or further analyzed as described below.

The light intensity video 202 and the depth video 204 may be at least partially spatially registered with each other. In the above described example implementation, the light intensity video 202 and the depth video 204 may be received from the tracking device 108. In particular, the tracking device 108 may include an infrared camera and a depth camera that have the same resolutions, although this is not required. Whether the cameras have the same or different resolutions, the pixels of the infrared camera may be registered to the pixels of the depth camera. In other implementations, the depth video and the infrared video may be received from other suitable sources having different resolutions/perspectives, and a suitable spatial-registration operation may be performed to identify a common frame of reference between the depth video and the infrared video. In either scenario, both infrared and depth information may be determined for each portion of an observed scene by considering the registered pixels from the infrared camera and the depth camera. The infrared video and the depth video may be received from any suitable sources in any suitable manner.

Continuing with FIG. 2, the previously-trained, machine-learning head detector 206 may be configured to find candidate human heads in the depth video 204. In one example implementation, the head detector 206 may be configured to classify depth pixels of the depth video 204 with a probability that a particular depth pixel corresponds to a human head. This type of head-only determination may be performed without considering whether a depth pixel corresponds to a body part other than the head. In other words, the head detector 206 determines whether or not a depth pixel corresponds to a human head, but is not concerned with what different body part the pixel images if the pixel does not image a human head. Since, the head detector 206 classifies the depth pixels according to two classes (e.g., "a human head" and "not a human head"), classification may be faster and/or more accurate relative to other machine-learning modules that attempt to classify all body parts. The fast and accurate processing allows the head detector to be run on every depth pixel in an image frame of the depth video 204 in order to find candidate human heads in a timely manner.

Once the depth pixels of the depth video 204 have been classified by the head detector 206, the head detector may be configured to identify any candidate human head(s) 212 in the depth video 204. In one example implementation, a candidate human head may include a contiguous region of depth pixels each having a probability of being a human head that is greater than a threshold. The threshold may be set to any suitable value. In one example, the threshold may be set based on the particular ground truth used to train the head detector 206. In a scenario where the depth video 204 includes a plurality of candidate human heads, the head detector may find and designate each candidate human head separately. A candidate human head may be determined by the head detector 206 in any suitable manner.

Each candidate human head 212 may be associated with a three-dimensional location 214 in the depth video 204. In one example, the three-dimensional location 214 may include x/y/z coordinates. In another example, the three-dimensional location 214 may include a plurality of x/y/z coordinates and/or x/y/z offsets that define a boundary in which the candidate human head is contained. The three-dimensional location 214 of each candidate human head may be output from the head detector 206 to the face recognizer 208 and/or the body tracker 210 to seed further identifying and tracking processing by these modules.

Figure 6:
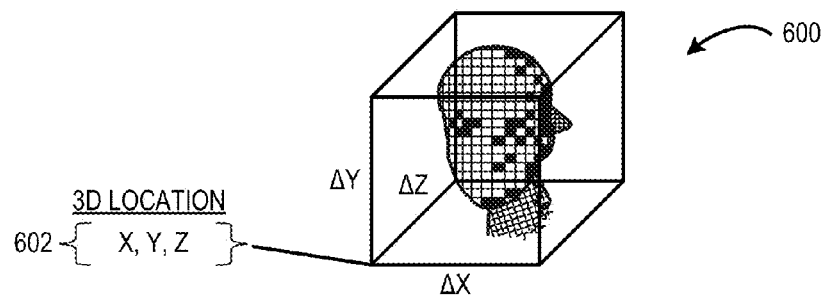
FIG. 6 shows a graphical representation of an example candidate human head found in depth video.

FIG. 6 shows an example graphical representation of a candidate human head 600 that may be found in the depth video 204 by the head detector 206. The candidate human head 600 may include a plurality of depth pixels that are classified as having a probability of being a human head that is above a threshold. The candidate human head 600 may be associated with a three-dimensional location 602. In the illustrated example, the three-dimensional location is defined as an x/y/z coordinate and a $\Delta x$, $\Delta y$, $\Delta z$ offset that collectively define a boundary in which the candidate human head is contained.

Turning back to FIG. 2, the previously-trained, machine-learning face recognizer 208 may use the three-dimensional location 214 of each candidate human head to spatially resolve a head region 216 of the light intensity video 202. The head region 216 may define a limited portion of the light intensity video 202 that is less than all of the infrared video. In one example, the head region 216 corresponds to a bounding box in a two-dimensional image frame of the light intensity video 202. For example, the bounding box may include all infrared pixels corresponding to depth pixels in the depth video 204 that correspond to the candidate human head. The face recognizer 208 may be configured to perform facial recognition on the head region of the candidate human head in order to identify a human face. The face recognizer 208 may be configured to perform facial recognition on all of the head regions of the light intensity video 202 without performing facial recognition on other portions of the infrared video outside of the head regions.

In one example, the face recognizer 208 may be configured to perform facial recognition using machine-learning classifiers trained to resolve one or more facial parameters (e.g., eye-to-eye spacing, eye-to-nose spacing, head size,). The face recognizer 208 may be configured to compare identified facial parameters to a database of facial parameters for known users, and thus attribute a recognized face to a particular individual. For example, a set of facial features may be compared to a plurality of different sets of facial features of different known human subjects (e.g., associated with user identities or profiles) in order to identify the human face 218. Any suitable facial recognition algorithm may be implemented to recognize a human face in the head region.

The face recognizer 208 may be configured to repeatedly scan the head region using different size bounding rectangles. In one example, the facial recognition scan may begin with a minimum size bounding rectangle, and the size of the bounding rectangle may be increased each subsequent scan until a face is detected. In another example, the facial recognition scan may begin with a maximum size bounding rectangle, and the size of the bounding rectangle may be decreased until a face is detected. The maximum and/or minimum size bounding rectangles may be selected so as to accommodate the range of human anatomy, without unnecessarily scanning areas of the infrared image that are unlikely to include a human face. If the scans of the head region do not positively identify a human face, the face recognizer 208 may scan other regions of the infrared video 202 and/or face identification may be bypassed altogether.

In some implementations, depth information corresponding to the candidate human head may be provided from the head detector 206 to the face recognizer 208 to further reduce an amount of facial recognition performed by the face recognizer. In particular, as described above, the face recognizer 208 may perform a plurality of scans of the head regions using different size bounding rectangles. Optionally, the face recognizer 208 may be configured to estimate the minimum size bounding rectangle and/or the maximum size bounding rectangle based on the depth information. For example, an average human face size may be scaled as a function of a distance of the candidate human head relative to the depth camera. Further, a delta may be applied to the scaled, average human face size to accommodate for small faces (e.g., children) and big faces in order to generate a small face estimate and a large face estimate. In other words, the small face estimate and the large face estimate each may be scaled as a function of distance derived from the depth video 204.

Figure 7:
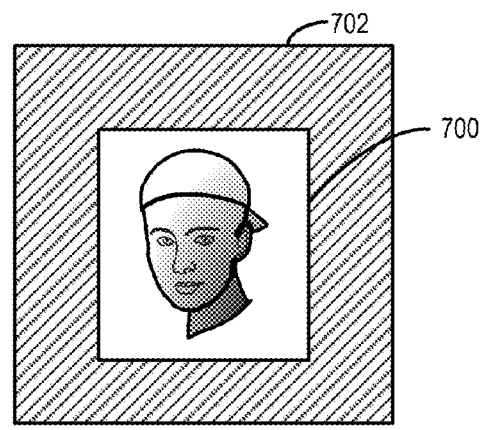
FIG. 7 shows a graphical representation of an example head region of infrared video that is spatially resolved with a three-dimensional location of the candidate human head of FIG. 6.

FIG. 7 shows an example graphical representation of a two-dimensional head region 700 of an infrared image frame 702 of the infrared video 202. The head region 700 may be spatially resolved with the three-dimensional location 602 of the candidate human head 600 in the depth video 204 by the face recognizer 208. The face recognizer 208 performs facial recognition on the pixels located inside the head region 700 without performing facial recognition on the other pixels of the infrared image frame 702 located outside of the head region. Although a single head region is shown in this example, a plurality of head regions may be spatial resolved in the infrared image frame 702, and the face recognizer 208 may perform facial recognition on each head region in order to identify all faces in the infrared image frame 702.

Figure 8:
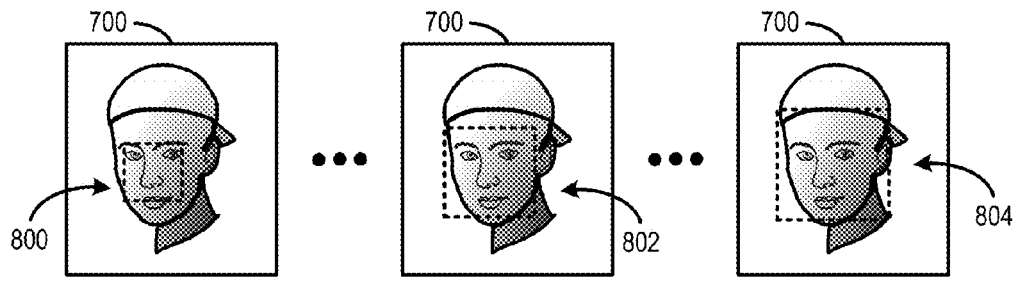
FIG. 8 shows graphical representations of a plurality of example facial recognition scans being performed on the example head region of FIG. 7.

FIG. 8 shows the example graphical representation of the two-dimensional head region 700 of the infrared image frame 702 being scanned using different sized bounding rectangles. The head region 700 may be initially scanned using the bounding rectangle 800 that is sized according to a small face estimate. The size of the bounding rectangle may be incrementally increased with each subsequent scan of the head region. For example, the head region 700 may be subsequently scanned using a bounding rectangle 802 that is sized according to an average face estimate. If a human face is not identified in the bounding rectangle 804, then a subsequent scan of the head region may use a bounding rectangle 806 that is sized according to the large face estimate.

By limiting the spatial area of image frames of the infrared video on which facial recognition is performed by the face recognizer 208, an amount of facial recognition processing may be reduced. Such a reduction may allow for additional processing resources to be made available for other purposes. For example, a frame rate of facial recognition may be increased.

Moreover, by using depth information as a seed to determine an area of an infrared image frame on which to perform facial recognition, facial topography may be used as a check to ensure that candidates are actually live human beings. As such, photographs, portraits, and other planar surfaces that have images of human faces may be eliminated from consideration by the head detector. Since such images of faces are not even passed to the face recognizer, the images of faces are not detected as false positives and processing resources are not wasted.

Continuing with FIG. 2, the previously-trained, machine-learning body tracker 210 may be configured to perform skeletal modeling on a body region 220 of the depth video 204 to produce a skeletal or other machine-readable body model. The body region 220 may be spatially contiguous with the three-dimensional location 214 of the candidate human head. The body region 220 may define a limited portion of the depth video 204. In one example, the body tracker 210 may be configured to analyze the depth pixels of the body region 220 of the depth video 204 in order to determine what part of the human subject's body each such pixel is likely to image. A variety of different body-part assignment techniques can be used to assess which part of a human subject's body a particular pixel is likely to image. Each pixel of the body region 220 may be assigned a body part index as classified by the body tracker 210. For example, the body part index may include a discrete identifier, confidence value, and/or body part probability distribution indicating the body part, or parts, to which that pixel is likely to image. Body part indices may be determined, assigned, and saved in any suitable manner without departing from the scope of this disclosure. The collection of body parts may comprise a skeletal model 222.

FIG. 5 shows a graphical representation of a virtual skeleton 500 (also referred to as a skeletal model) that serves as a machine-readable representation of the game player 106. The virtual skeleton 500 includes twenty virtual joints—{head, shoulder center, spine, hip center, right shoulder, right elbow, right wrist, right hand, left shoulder, left elbow, left wrist, left hand, right hip, right knee, right ankle, right foot, left hip, left knee, left ankle, and left foot}. This twenty joint virtual skeleton is provided as a nonlimiting example. Virtual skeletons in accordance with the present disclosure may have virtually any number of joints.

The various skeletal joints may correspond to actual joints of a human subject, centroids of the human subject's body parts, terminal ends of a human subject's extremities, and/or points without a direct anatomical link to the human subject. Each joint has at least three degrees of freedom (e.g., world space x, y, z). As such, each joint of the virtual skeleton is defined with a three-dimensional position. The virtual skeleton 500 may optionally include a plurality of virtual bones. The various skeletal bones may extend from one skeletal joint to another and may correspond to actual bones, limbs, or portions of bones and/or limbs of a human subject. The skeletal model 500 may track motion of the game player 106 throughout the depth video 204.

In some implementations, the body tracker 210 may be configured to receive the three-dimensional location 214 of the candidate human head 212 from the head detector 206. Further, the body tracker 210 may be configured to constrain a head joint of the skeletal model 222 to the three-dimensional location 214 of the candidate human head 212 as identified by the head detector 206. By constraining the head joint to the three-dimensional location 214, accuracy may be increased and or processing may be decreased.

In some implementations, the body tracker 210 may perform skeletal modeling and the face recognizer 208 may perform facial recognition in parallel in order to provide faster biometric identification and tracking lock-on. In particular, such parallel processing may be enabled, because the face recognizer 208 is seeded with head detection data that provides a head region on which to perform facial recognition. In other words, the face recognizer 208 does not have to wait for the body tracker 210 to provide a head region in order to begin facial recognition.

Furthermore, in some cases, the skeletal model 222 may be produced by the body tracker 210 before the human face 218 is positively identified by the face recognizer 208. Once a face is identified, the face recognizer 208 may be configured to associate the skeletal model 222 with the human face 218. For example, the positively identified human face may be associated with a user identity or player index that allows motion or gestures recognized from the skeletal model to be attributed to the user identity.

Figure 9:
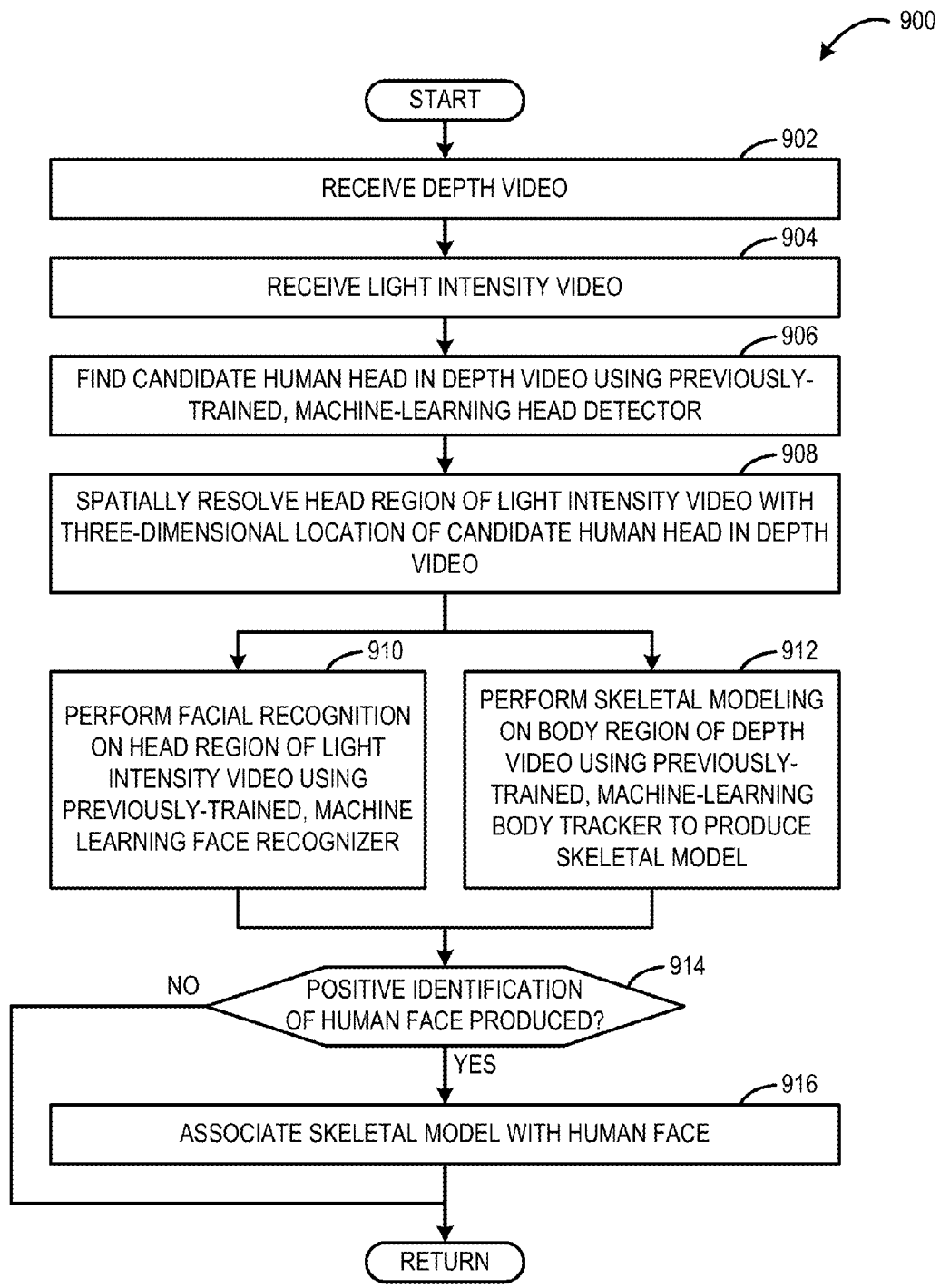
FIG. 9 shows an example method for identifying and tracking a human subject.

FIG. 9 shows an example method 900 for identifying and tracking a human subject. For example, the method 900 may be performed by the computing system 102 shown in FIG. 1 or the computing system 1000 shown in FIG. 10. At 902, the method 900 may include receiving a depth video. For example, the depth video may be provided from a depth camera of a tracking device, such as tracking device 108 shown in FIG. 1 or input subsystem 1008 shown in FIG. 10.

At 904, the method 900 may include receiving a light intensity video. For example, the light intensity video may be an infrared video provided from an infrared camera of a tracking device, such as tracking device 108 shown in FIG. 1 or input subsystem 1008 shown in FIG. 10. The light intensity video may be at least partially spatially-registered to the depth video.

At 906, the method 900 may include finding a candidate human head in the depth video using a previously-trained, machine-learning head detector, such as head detector 206 shown in FIG. 2.

At 908, the method 900 may include spatially resolving a head region of the light intensity video with a three-dimensional location of the candidate human head in the depth video. In one example, the candidate human head may include a contiguous region of depth pixels each having a probability that is greater than a threshold of being a human head as classified by the head detector. Further, in one example, the head region may define a limited portion of the light intensity video. For example, the head region may define only the portion of the two-dimensional image frame that is spatially resolved to the three-dimensional location of the candidate human head in the depth video.

At 910, the method 900 may include performing facial recognition on the head region of the light intensity video using a previously-trained machine-learning face recognizer, such as the face recognizer 208 shown in FIG. 2.

At 912, the method 900 may include performing skeletal modeling on a body region of the depth video using a previously-trained, machine-learning body tracker to produce a skeletal model, such as the body tracker 210 shown in FIG. 2. The body region may be spatially contiguous with the three-dimensional location of the candidate human head. The body region may define a limited portion of the depth video.

In some implementations, the skeletal modeling (912) and the facial recognition (910) may be performed in parallel. In some implementations, the skeletal modeling may seed the facial recognition, and in some implementations the facial recognition may seed the skeletal modeling.

At 914, the method 900 may include determining whether a positive identification of a human face in the head region is produced by the face recognizer. If a positive identification of a human face in the head region is produced by the face recognizer, then the method 900 moves to 916. Otherwise, other identification strategies may be employed, or identification may be bypassed.

At 916, the method 900 may include responsive to the face recognizer producing a positive identification of a human face in the head region of the light intensity video, associating the skeletal model with the human face.

By performing depth-based head detection to limit a spatial region of light intensity video on which facial recognition is performed, an amount of facial recognition processing may be reduced and overall processing resource utilization may be decreased. Because a head tracker seeds the facial recognition, as opposed to a full body tracker, processing is further reduced. In this way, biometric identification and tracking lock-on may be achieved in a faster and more robust manner.

In some embodiments, the methods and processes described herein may be tied to a computing system of one or more computing devices. In particular, such methods and processes may be implemented as a computer-application program or service, an application-programming interface (API), a library, and/or other computer-program product.

Figure 10:
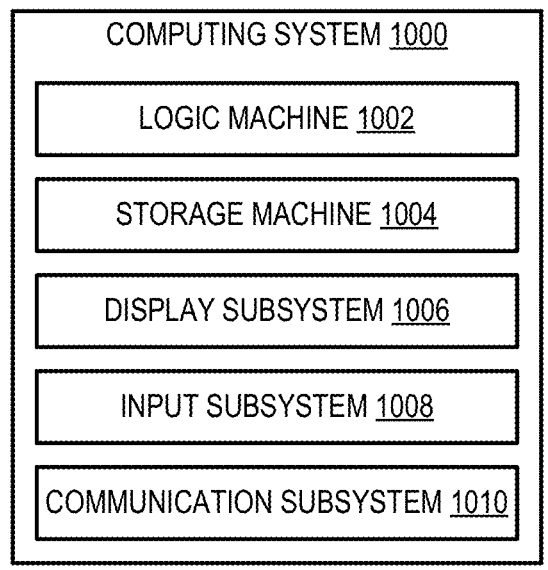
FIG. 10 shows an example computing system.

FIG. 10 schematically shows a non-limiting embodiment of a computing system 1000 that can enact one or more of the methods and processes described above. Computing system 1000 is shown in simplified form. Computing system 1000 may take the form of one or more personal computers, server computers, tablet computers, home-entertainment computers, network computing devices, gaming devices, mobile computing devices, mobile communication devices (e.g., smart phone), and/or other computing devices.

Computing system 1000 includes a logic machine 1002 and a storage machine 1004. Computing system 1000 may optionally include a display subsystem 1006, input subsystem 1008, communication subsystem 1010, and/or other components not shown in FIG. 10.

Logic machine 1002 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 1002 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1004 includes one or more physical devices configured to hold instructions executable by the logic machine to implement the methods and processes described herein. When such methods and processes are implemented, the state of storage machine 1004 may be transformed—e.g., to hold different data.

Storage machine 1004 may include removable and/or built-in devices. Storage machine 1004 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1004 may include volatile, nonvolatile, dynamic, static, read/write, read-only, random-access, sequential-access, location-addressable, file-addressable, and/or content-addressable devices.

It will be appreciated that storage machine 1004 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1002 and storage machine 1004 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 1000 implemented to perform a particular function. In some cases, a module, program, or engine may be instantiated via logic machine 1002 executing instructions held by storage machine 1004. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 1006 may be used to present a visual representation of data held by storage machine 1004. This visual representation may take the form of a graphical user interface (GUI). As the herein described methods and processes change the data held by the storage machine, and thus transform the state of the storage machine, the state of display subsystem 1006 may likewise be transformed to visually represent changes in the underlying data. Display subsystem 1006 may include one or more display devices utilizing virtually any type of technology. Such display devices may be combined with logic machine 1002 and/or storage machine 1004 in a shared enclosure, or such display devices may be peripheral display devices.

When included, input subsystem 1008 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1010 may be configured to communicatively couple computing system 1000 with one or more other computing devices. Communication subsystem 1010 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 1000 to send and/or receive messages to and/or from other devices via a network such as the Internet.

An example provides, on a computing system, a method comprising receiving a depth video, receiving a light intensity video at least partially spatially-registered to the depth video, finding a candidate human head in the depth video using a head detector, spatially resolving a head region of the light intensity video with a three-dimensional location of the candidate human head in the depth video, the head region defining a limited portion of the light intensity video, and performing facial recognition on the head region of the light intensity video using a face recognizer. Optionally, the method further comprises performing skeletal modeling on a body region of the depth video using a body tracker to produce a skeletal model. The body region may be spatially contiguous with the three-dimensional location of the candidate human head, and the body region may define a limited portion of the depth video. Optionally, the skeletal modeling and the facial recognition may be performed in parallel. Optionally, the method further comprises responsive to the face recognizer producing a positive identification of a human face in the head region of the light intensity video, associating the skeletal model with the human face. Optionally, the body tracker may be configured to constrain a head joint of the skeletal model to the three-dimensional location of the candidate human head as identified by the head detector. Optionally, the head detector may be configured to classify depth pixels of the depth video by producing for each depth pixel a probability that the depth pixel corresponds to a human head without producing a probability that the depth pixel corresponds to another body part. The candidate human head may include a contiguous region of depth pixels each having a probability this is greater than a threshold. Optionally, the face recognizer may be configured to repeatedly scan the head region inside a bounding rectangle. A size of the bounding rectangle may change each scan. Optionally, the bounding rectangle may be scaled as a function of a depth of the candidate human head. Any or all of the above-described examples may be combined in any suitable manner in various implementations.

Another example, provides a computing system comprising a logic machine, and a storage machine holding instruction executable by the logic machine to receive a depth video, receive an infrared video at least partially spatially-registered to the depth video, find a candidate human head in the depth video using a previously-trained, machine-learning head detector, spatially resolve a head region of the infrared video with a three-dimensional location of the candidate human head in the depth video, the head region defining a limited portion of the infrared video, perform facial recognition on the head region of the infrared video using a previously-trained, machine-learning face recognizer, and perform skeletal modeling on a body region of the depth video using a previously-trained, machine-learning body tracker to produce a skeletal model, the body region being spatially contiguous with the three-dimensional location of the candidate human head, and the body region defining a limited portion of the depth video. Optionally, the skeletal modeling and the facial recognition are performed in parallel. Optionally, the storage machine may further hold instructions executable by the logic machine to responsive to the previously-trained, machine-learning face recognizer producing a positive identification of a human face in the head region of the infrared video, associate the skeletal model with the human face. Optionally, the previously-trained, machine-learning body tracker may be configured to constrain a head joint of the skeletal model to the three-dimensional location of the candidate human head as identified by the previously-trained, machine-learning head detector. Optionally, the previously-trained, machine-learning head detector may be configured to classify depth pixels of the depth video by producing for each depth pixel a probability that the depth pixel corresponds to a human head without producing a probability that the depth pixel corresponds to another body part. The candidate human may head include a contiguous region of depth pixels each having a probability this is greater than a threshold. Optionally the previously-trained, machine-learning face recognizer may be configured to repeatedly scan the head region inside a bounding rectangle. A size of the bounding rectangle may change each scan. Optionally, the bounding rectangle may be scaled as a function of a depth of the candidate human head. Any or all of the above-described examples may be combined in any suitable manner in various implementations.

Another example provides a computing system comprising a logic machine, and a storage machine holding instruction executable by the logic machine to receive a depth video, receive an infrared video at least partially spatially-registered to the depth video, find a candidate human head in the depth video using a previously-trained, machine-learning head detector, spatially resolve a head region of the infrared video with a three-dimensional location of the candidate human head in the depth video, the head region defining a limited portion of the infrared video, perform facial recognition on the head region of the infrared video using a previously-trained, machine-learning face recognizer, perform skeletal modeling on a body region of the depth video using a previously-trained, machine-learning body tracker to produce a skeletal model, the previously-trained, machine-learning body tracker being configured to constrain a head joint of the skeletal model to the three-dimensional location of the candidate human head as identified by the previously-trained, machine-learning head detector. The body region may be spatially contiguous with the three-dimensional location of the candidate human head, and the body region defining a limited portion of the depth video. Optionally, the storage machine may further hold instructions executable by the logic machine to responsive to the previously-trained, machine-learning face recognizer producing a positive identification of a human face in the head region of the infrared video, associate the skeletal model with the human face. Optionally, the previously-trained, machine-learning head detector may be configured to classify depth pixels of the depth video by producing for each depth pixel a probability that the depth pixel corresponds to a human head without producing a probability that the depth pixel corresponds to another body part. The candidate human head may include a contiguous region of depth pixels each having a probability this is greater than a threshold. Optionally, the previously-trained, machine-learning face recognizer may be configured to repeatedly scan the head region inside a bounding rectangle. A size of the bounding rectangle may change each scan. The bounding rectangle may be scaled as a function of a depth of the candidate human head. Optionally, the skeletal modeling and the facial recognition may be performed in parallel. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. On a computing system, a method comprising:
   receiving a depth video;
   receiving a light intensity video at least partially spatially-registered to the depth video;
   finding a candidate human head in the depth video using a head detector;
   spatially resolving a head region of the light intensity video with a three-dimensional location of the candidate human head in the depth video, the head region defining a limited portion of the light intensity video; and
   performing facial recognition on only the head region of the light intensity video using a face recognizer.

2. The method of claim 1, further comprising:
   performing skeletal modeling on a body region of the depth video using a body tracker to produce a skeletal model, the body region being spatially contiguous with the three-dimensional location of the candidate human head, and the body region defining a limited portion of the depth video.

3. The method of claim 2, wherein the skeletal modeling and the facial recognition are performed in parallel.

4. The method of claim 2, further comprising:
   responsive to the face recognizer producing a positive identification of a human face in the head region of the light intensity video, associating the skeletal model with the human face.

5. The method of claim 2, wherein the body tracker is configured to constrain a head joint of the skeletal model to the three-dimensional location of the candidate human head as identified by the head detector.

6. The method of claim 1, wherein the head detector is configured to classify depth pixels of the depth video by producing for each depth pixel a probability that the depth pixel corresponds to a human head without producing a probability that the depth pixel corresponds to another body part, and wherein the candidate human head includes a contiguous region of depth pixels each having a probability this is greater than a threshold.

7. The method of claim 1, wherein the face recognizer is configured to repeatedly scan the head region inside a bounding rectangle, a size of the bounding rectangle changing each scan.

8. The method of claim 7, wherein the bounding rectangle is scaled as a function of a depth of the candidate human head.

9. A computing system, comprising:
a logic machine; and
a storage machine holding instruction executable by the logic machine to:
receive a depth video;
receive an infrared video at least partially spatially-registered to the depth video;
find a candidate human head in the depth video using a previously-trained, machine-learning head detector;
spatially resolve a head region of the infrared video with a three-dimensional location of the candidate human head in the depth video, the head region defining a limited portion of the infrared video;
perform facial recognition on only the head region of the infrared video using a previously-trained, machine-learning face recognizer; and
perform skeletal modeling on a body region of the depth video using a previously-trained, machine-learning body tracker to produce a skeletal model, the body region being spatially contiguous with the three-dimensional location of the candidate human head, and the body region defining a limited portion of the depth video.

10. The computing system of claim 9, wherein the skeletal modeling and the facial recognition are performed in parallel.

11. The computing system of claim 9, wherein the storage machine further holds instructions executable by the logic machine to:
responsive to the previously-trained, machine-learning face recognizer producing a positive identification of a human face in the head region of the infrared video, associate the skeletal model with the human face.

12. The computing system of claim 9, wherein the previously-trained, machine-learning body tracker is configured to constrain a head joint of the skeletal model to the three-dimensional location of the candidate human head as identified by the previously-trained, machine-learning head detector.

13. The computing system of claim 9, wherein the previously-trained, machine-learning head detector is configured to classify depth pixels of the depth video by producing for each depth pixel a probability that the depth pixel corresponds to a human head without producing a probability that the depth pixel corresponds to another body part, and wherein the candidate human head includes a contiguous region of depth pixels each having a probability this is greater than a threshold.

14. The computing system of claim 9, wherein the previously-trained, machine-learning face recognizer is configured to repeatedly scan the head region inside a bounding rectangle, a size of the bounding rectangle changing each scan.

15. The computing system of claim 14, wherein the bounding rectangle is scaled as a function of a depth of the candidate human head.

16. A computing system, comprising:
a logic machine; and
a storage machine holding instruction executable by the logic machine to:
receive a depth video;
receive an infrared video at least partially spatially-registered to the depth video;
find a candidate human head in the depth video using a previously-trained, machine-learning head detector;
spatially resolve a head region of the infrared video with a three-dimensional location of the candidate human head in the depth video, the head region defining a limited portion of the infrared video;
perform facial recognition on only the head region of the infrared video using a previously-trained, machine-learning face recognizer;
perform skeletal modeling on a body region of the depth video using a previously-trained, machine-learning body tracker to produce a skeletal model, the previously-trained, machine-learning body tracker being configured to constrain a head joint of the skeletal model to the three-dimensional location of the candidate human head as identified by the previously-trained, machine-learning head detector, the body region being spatially contiguous with the three-dimensional location of the candidate human head, and the body region defining a limited portion of the depth video.

17. The computing system of claim 16, wherein the storage machine further holds instructions executable by the logic machine to:
responsive to the previously-trained, machine-learning face recognizer producing a positive identification of a human face in the head region of the infrared video, associate the skeletal model with the human face.

18. The computing system of claim 16, wherein the previously-trained, machine-learning head detector is configured to classify depth pixels of the depth video by producing for each depth pixel a probability that the depth pixel corresponds to a human head without producing a probability that the depth pixel corresponds to another body part, and wherein the candidate human head includes a contiguous region of depth pixels each having a probability this is greater than a threshold.

19. The computing system of claim 16, wherein the previously-trained, machine-learning face recognizer is configured to repeatedly scan the head region inside a bounding rectangle, a size of the bounding rectangle changing each scan, and wherein the bounding rectangle is scaled as a function of a depth of the candidate human head.

20. The computing system of claim 16, wherein finding the candidate human head in the depth video is performed prior to performing facial recognition on the infrared video, and wherein the skeletal modeling and the facial recognition are performed in parallel.

* * * * *